United States Patent
Kim et al.

(10) Patent No.: US 8,282,862 B1
(45) Date of Patent: Oct. 9, 2012

(54) TRIPHENYLMETHANE BASED COMPLEX DYE, PHOTOSENSITIVE RESIN COMPOSITION FOR COLOR FILTER INCLUDING THE SAME AND COLOR FILTER PREPARED USING THE SAME

(75) Inventors: Nam-Gwang Kim, Uiwang-si (KR); Jianhua Li, San Jose, CA (US); Sina Maghsoodi, San Jose, CA (US); Shahrokh Motallebi, San Jose, CA (US); Jae-Hyun Kim, Uiwang-si (KR); Gyu-Seok Han, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 0 days.

(21) Appl. No.: 13/166,839

(22) Filed: Jun. 23, 2011

(51) Int. Cl.
  *F21V 9/00* (2006.01)
  *G02B 5/02* (2006.01)
  *G02C 7/10* (2006.01)
  *G02F 1/361* (2006.01)
  *G03B 11/00* (2006.01)
  *C09B 11/04* (2006.01)

(52) U.S. Cl. ............ 252/582; 252/586; 257/432; 430/7; 430/270.1; 430/286.1; 430/434; 552/101

(58) Field of Classification Search .................. 252/582, 252/586; 257/432, E31.127; 358/1.9; 430/7, 430/286.1, 270.1, 434; 524/377, 516; 552/101
See application file for complete search history.

(56) References Cited

U.S. PATENT DOCUMENTS

2003/0072017 A1* 4/2003 Sato ............................... 358/1.9

FOREIGN PATENT DOCUMENTS

JP 08-333517 * 12/1996

* cited by examiner

*Primary Examiner* — Bijan Ahvazi
(74) *Attorney, Agent, or Firm* — Lee & Morse, P.C.

(57) ABSTRACT

A triphenylmethane-based complex dye, a photosensitive resin composition, and a color filter, the triphenylmethane-based complex dye being represented by the following Chemical Formula 1:

[Chemical Formula 1]

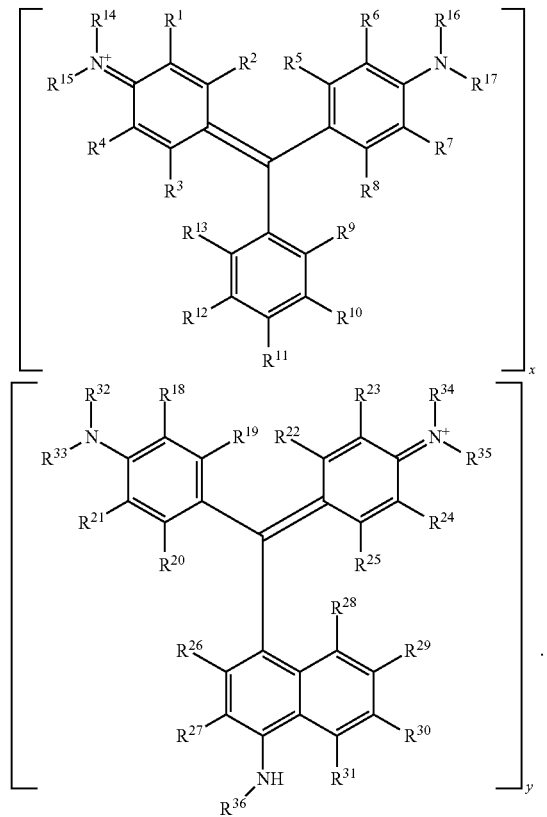

8 Claims, 1 Drawing Sheet

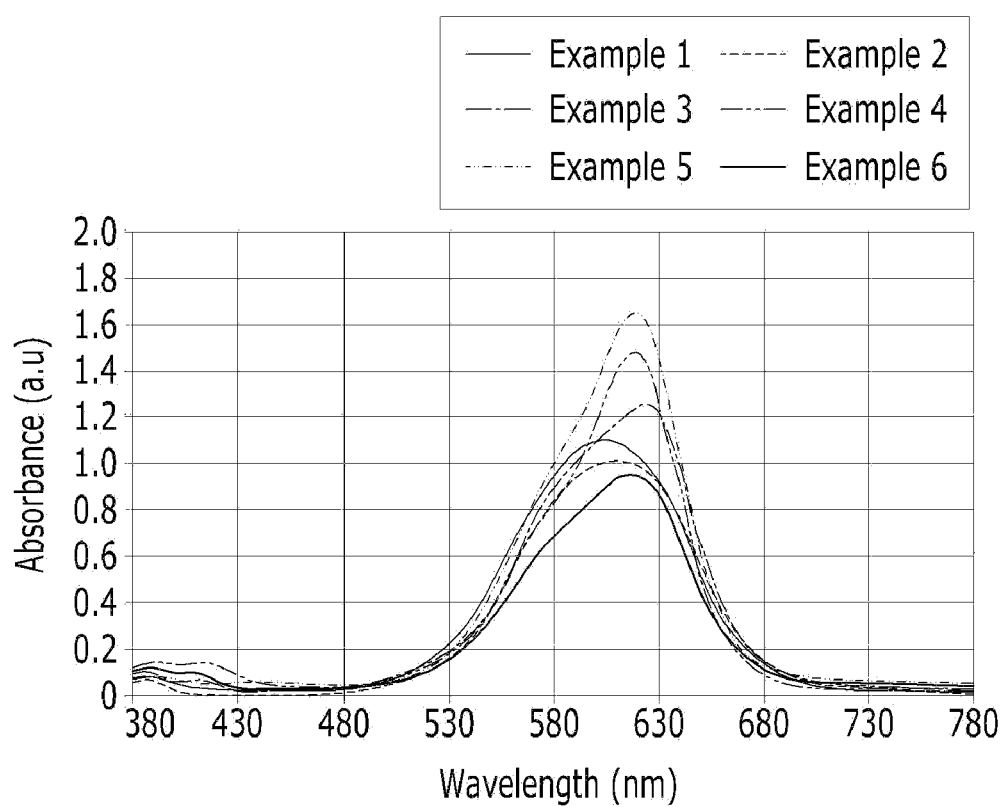

TRIPHENYLMETHANE BASED COMPLEX DYE, PHOTOSENSITIVE RESIN COMPOSITION FOR COLOR FILTER INCLUDING THE SAME AND COLOR FILTER PREPARED USING THE SAME

BACKGROUND

1. Field

Embodiments relate to a triphenylmethane based complex dye, a photosensitive resin composition for a color filter including the same, and a color filter prepared using the same.

2. Description of the Related Art

Advances in optical display devices have made it possible to realize high contrast ratio and high luminance. Providing vivid and high quality screen images at low electric power are also desirable. A color filter may use a pigment dispersed solution as a colorant.

SUMMARY

Embodiments are directed to a triphenylmethane based complex dye, a photosensitive resin composition for a color filter including the same, and a color filter prepared using the same.

The embodiments may be realized by providing a triphenylmethane-based complex dye represented by the following Chemical Formula 1:

[Chemical Formula 1]

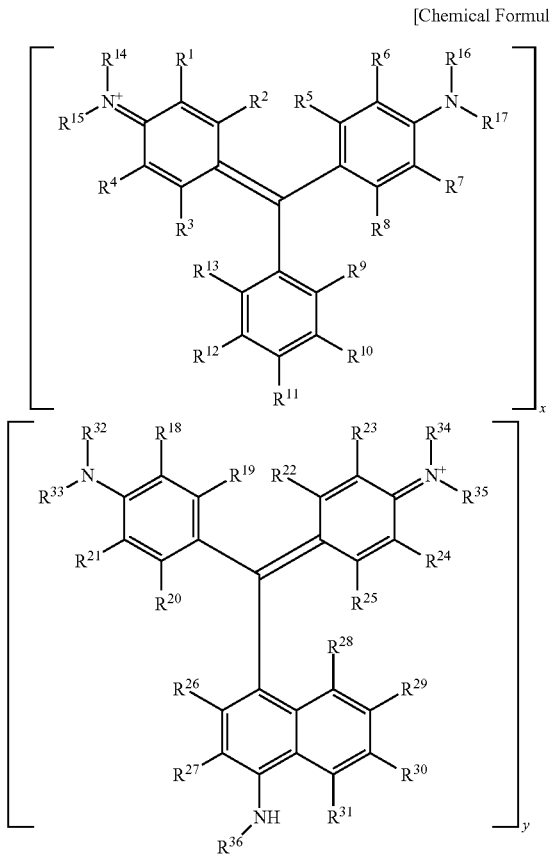

wherein, in Chemical Formula 1, $R^1$ to $R^{12}$ are each independently hydrogen, a substituted or unsubstituted C1 to C20 alkyl group, a sulfonate group, a hydroxyl group, or a substituent represented by the following Chemical Formula 2 or Chemical Formula 3, provided that at least two of $R^1$ to $R^{17}$ are a sulfonate group or a substituent represented by the following Chemical Formula 3, $R^{18}$ to $R^{31}$ are each independently hydrogen or a substituted or unsubstituted C1 to C20 alkyl group, $R^{32}$ to $R^{35}$ are each independently hydrogen or a substituted or unsubstituted C1 to C5 alkyl group, $R^{36}$ is a substituted or unsubstituted C1 to C20 alkyl group, and x and y are each an integer of about 1 to about 3,

[Chemical Formula 2]

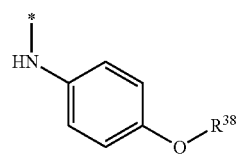

wherein, in Chemical Formula 2, $R^{38}$ is a substituted or unsubstituted C1 to C20 alkyl group, and

[Chemical Formula 3]

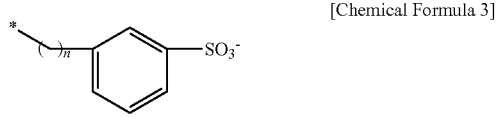

wherein, in Chemical Formula 3, n is an integer of about 1 to about 5.

The triphenylmethane-based complex dye represented by Chemical Formula 1 may be a complex represented by one of the following Chemical Formulae 4-1 to 4-6:

[Chemical Formula 4-1]
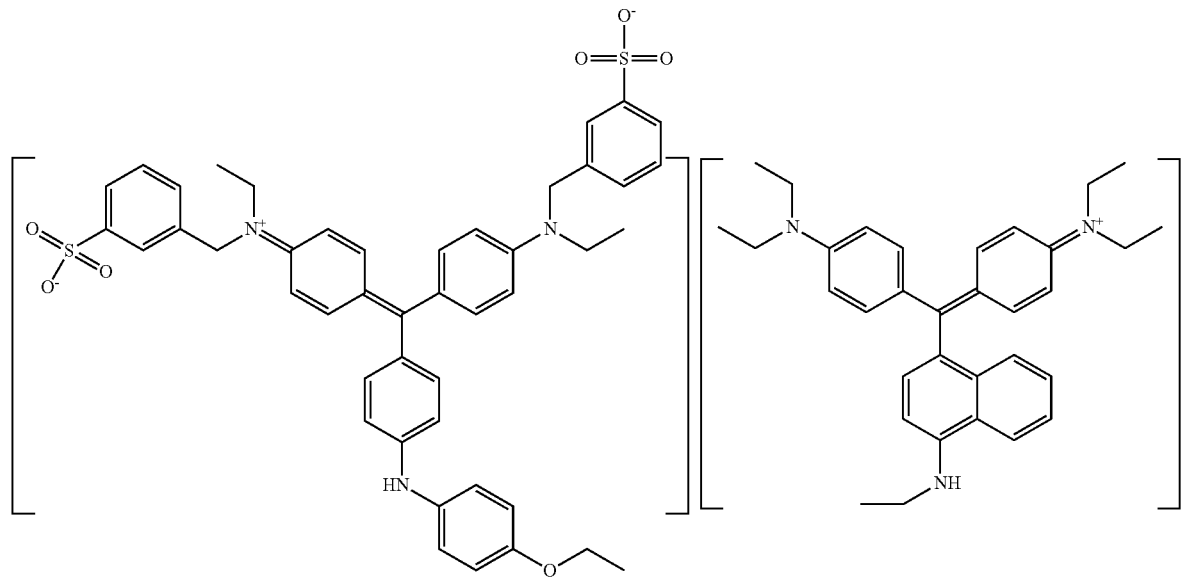
[Chemical Formula 4-2]
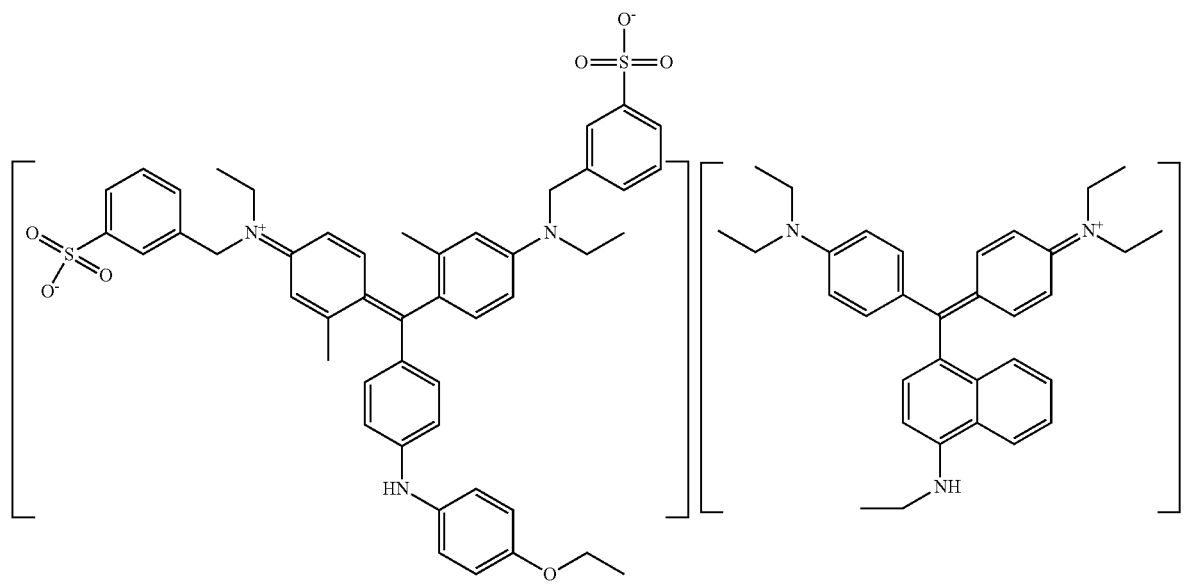

[Chemical Formula 4-3]
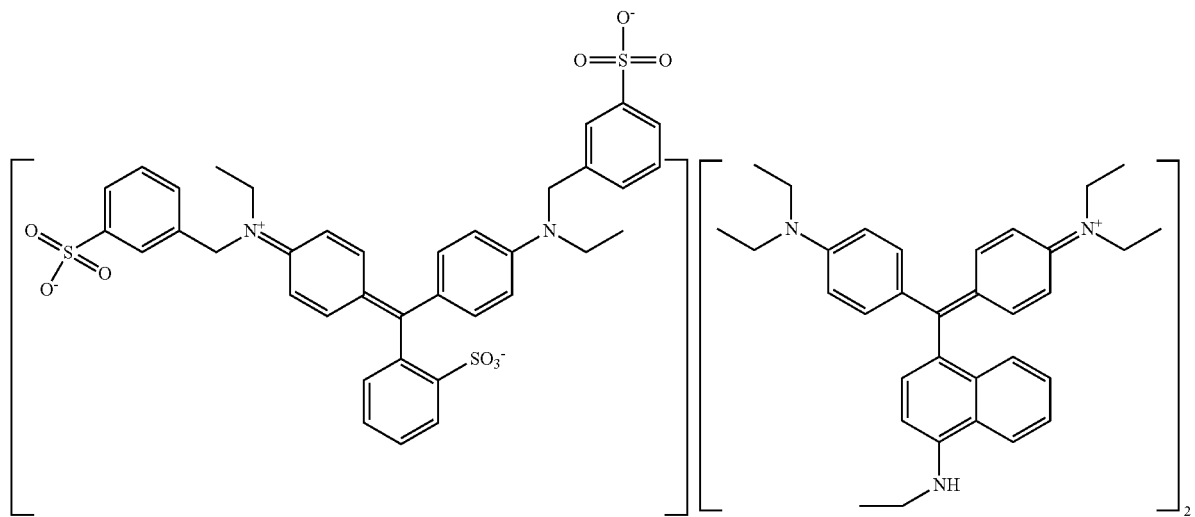
[Chemical Formula 4-4]
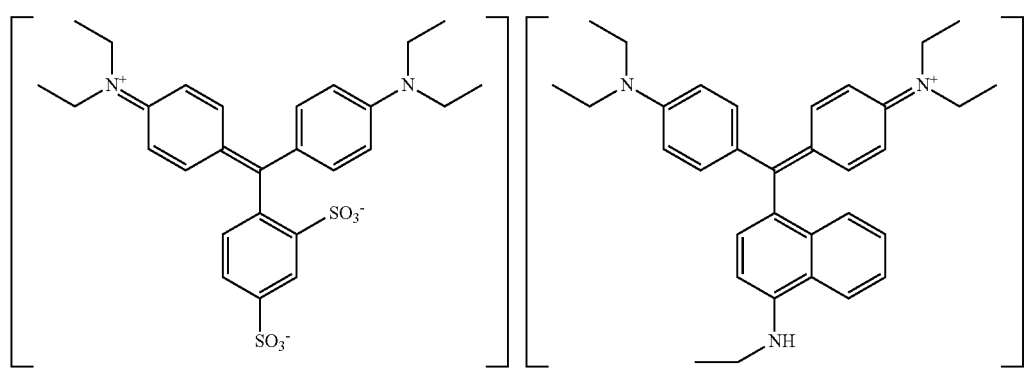
[Chemical Formula 4-5]
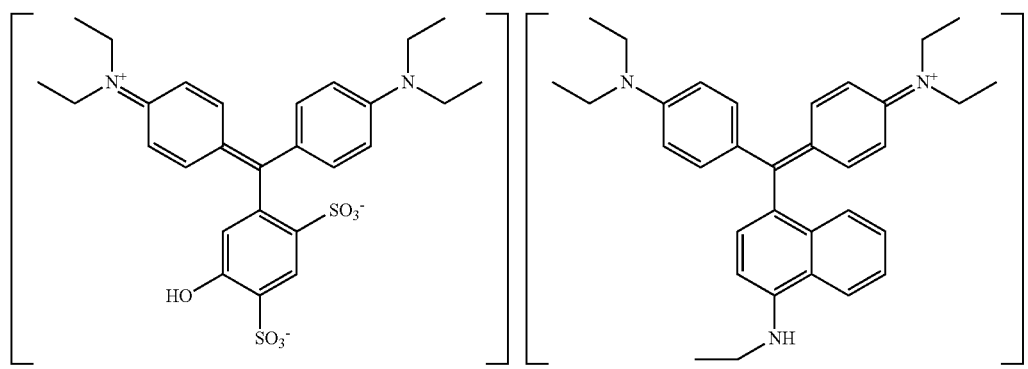

Chemical Formula 4-6]

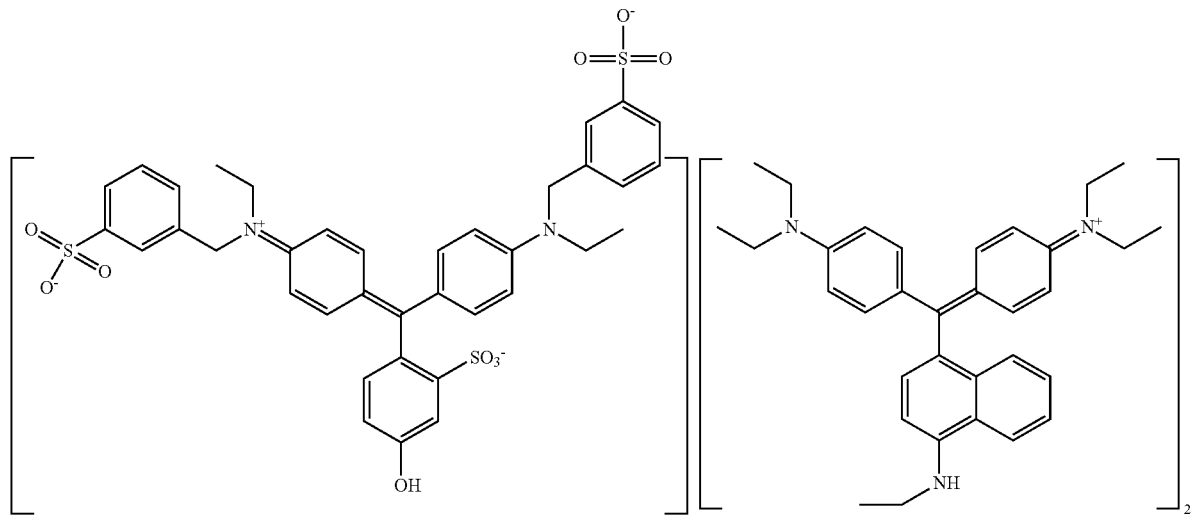

The triphenylmethane-based complex dye may have a maximum absorption in a wavelength region of about 550 nm to about 650 nm.

The triphenylmethane-based complex dye may have a transmittance of about 90% or higher at a wavelength region of about 450 nm.

The embodiments may also be realized by providing a photosensitive resin composition for a color filter, the photosensitive resin composition including a colorant, the colorant including the triphenylmethane-based complex dye of an embodiment; an acryl-based binder resin; a photopolymerizable monomer; a photopolymerization initiator; and a solvent.

The photosensitive resin composition may include about 0.1 to about 30 wt % of the colorant, about 1 to about 30 wt % of the acryl-based binder resin, about 1 to about 20 wt % of the photopolymerizable monomer, about 0.1 to about 10 wt % of the photopolymerization initiator, and a balance amount of the solvent, all wt % being based on a total weight of the composition.

The colorant may further include a pigment.

The embodiments may also be realized by providing a color filter prepared from the photosensitive resin composition of an embodiment.

BRIEF DESCRIPTION OF THE DRAWING

The above and other features and advantages will become more apparent to those of ordinary skill in the art by describing in detail exemplary embodiments with reference to the attached drawing, in which:

FIG. 1 illustrates a graph showing absorbance of dyes used in Examples 1 to 6.

DETAILED DESCRIPTION

Example embodiments will now be described more fully hereinafter with reference to the accompanying drawing; however, they may be embodied in different forms and should not be construed as limited to the embodiments set forth herein. Rather, these embodiments are provided so that this disclosure will be thorough and complete, and will fully convey the scope of the invention to those skilled in the art.

As used herein, when specific definition is not otherwise provided, the term "substituted" may refer to one having a halogen (F, Cl, Br or I), a hydroxyl group, a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C3 to C20 cycloalkyl group, a C3 to C20 cycloalkenyl group, a C2 to C20 heterocycloalkyl group, a C2 to C20 heterocycloalkenyl group, a C2 to C20 heterocycloalkynyl group, or a combination thereof, in place of at least one hydrogen.

An embodiment provides a triphenylmethane-based complex dye. For example, the triphenylmethane-based complex dye according to an embodiment may be a triphenylmethane-based complex dye salt.

The triphenylmethane-based complex dye may be a compound having an organic counter ion. In an implementation, the triphenylmethane-based complex dye may be a complex compound formed of an anionic organic compound and a cationic organic compound. The anionic organic compound may include a sulfonate group; and the cationic organic compound may include an alkyl amine group.

The triphenylmethane-based complex dye may be a complex represented by the following Chemical Formula 1.

[Chemical Formula 1]

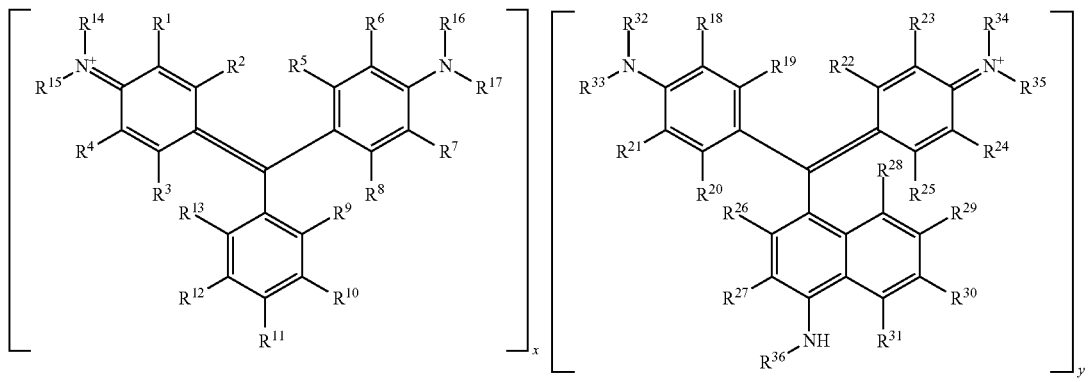

In Chemical Formula 1, $R^1$ to $R^{17}$ may each independently be hydrogen, a substituted or unsubstituted C1 to C20 alkyl group, a sulfonate group, a hydroxyl group, or a substituent represented by the following Chemical Formula 2 or Chemical Formula 3. In an implementation, at least two of $R^1$ to $R^{17}$ may be a sulfonate group or a substituent represented by the following Chemical Formula 3.

[Chemical Formula 2]

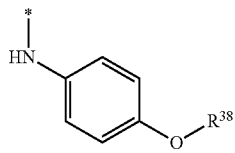

In Chemical Formula 2, $R^{38}$ may be a substituted or unsubstituted C1 to C20 alkyl group.

[Chemical Formula 3]

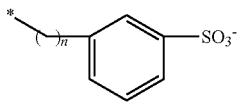

In Chemical Formula 3, n may be an integer of about 1 to about 5.

In an implementation, the portion of Chemical Formula 1 having the $R^1$ to $R^{17}$ substituents may be an anionic compound including at least two sulfonate groups.

In Chemical Formula 1, $R^{18}$ to $R^{31}$ may each independently be hydrogen or a substituted or unsubstituted C1 to C20 alkyl group, $R^{32}$ to $R^{35}$ may each independently be hydrogen or a substituted or unsubstituted C1 to C5 alkyl group, and $R^{36}$ may be a substituted or unsubstituted C1 to C20 alkyl group.

The portion of Chemical Formula 1 having the $R^{18}$ to $R^{36}$ substituents may be a cationic compound including an alkyl amine group.

In Chemical Formula 1, x and y may each be an integer of about 1 to about 3.

The triphenylmethane-based complex dye may help ensure excellent compatibility with respect to an organic material, thereby ensuring excellent solubility in an organic solvent. In addition, the triphenylmethane-based complex dye may exhibit high transmittance in a blue region and may have fine coloring power. Accordingly, the triphenylmethane-based complex dye may be suitably used for a colorant.

The triphenylmethane-based complex dye may be a blue-based dye. In an implementation, the triphenylmethane-based complex dye may be a dye of a blue or violet color.

The triphenylmethane-based complex dye represented by Chemical Formula 1 may be a complex represented by one of the following Chemical Formulae 4-1 to 4-6.

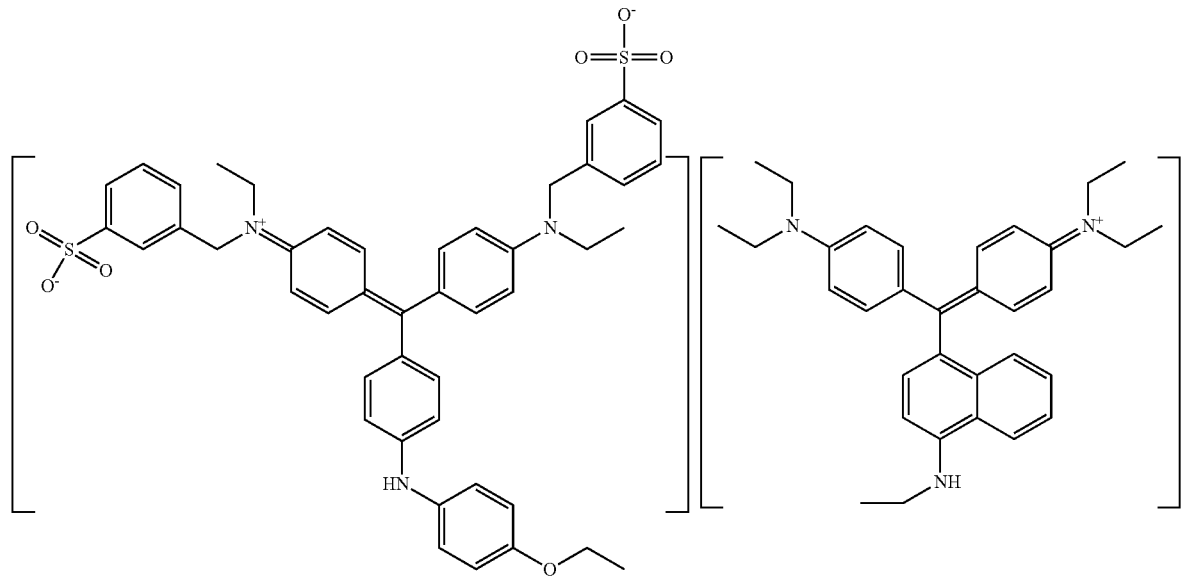
[Chemical Formula 4-1]
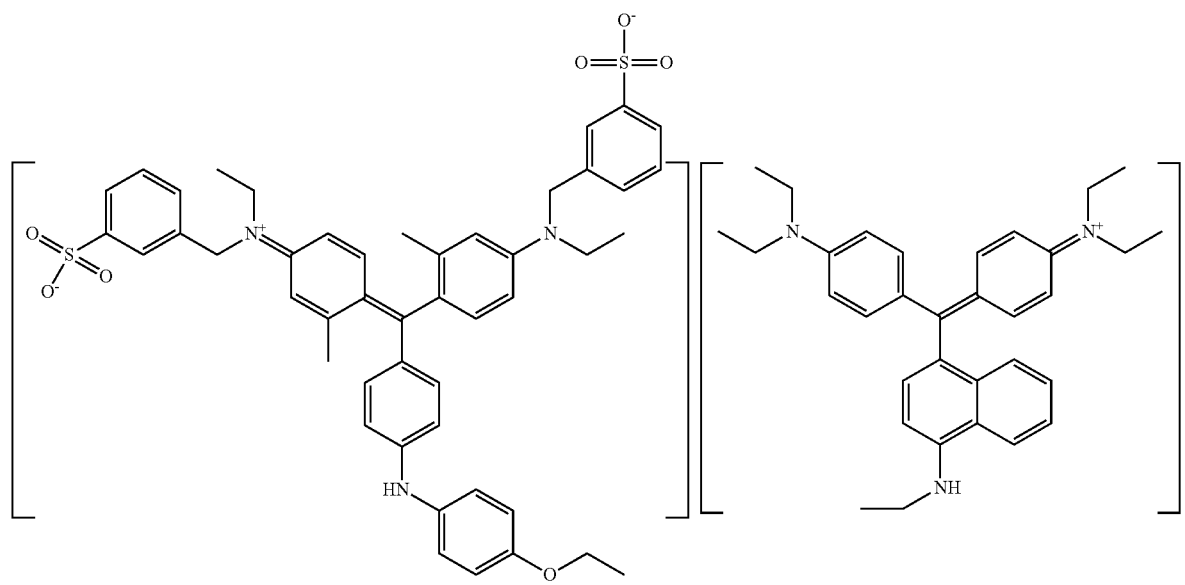
[Chemical Formula 4-2]

[Chemical Formula 4-3]
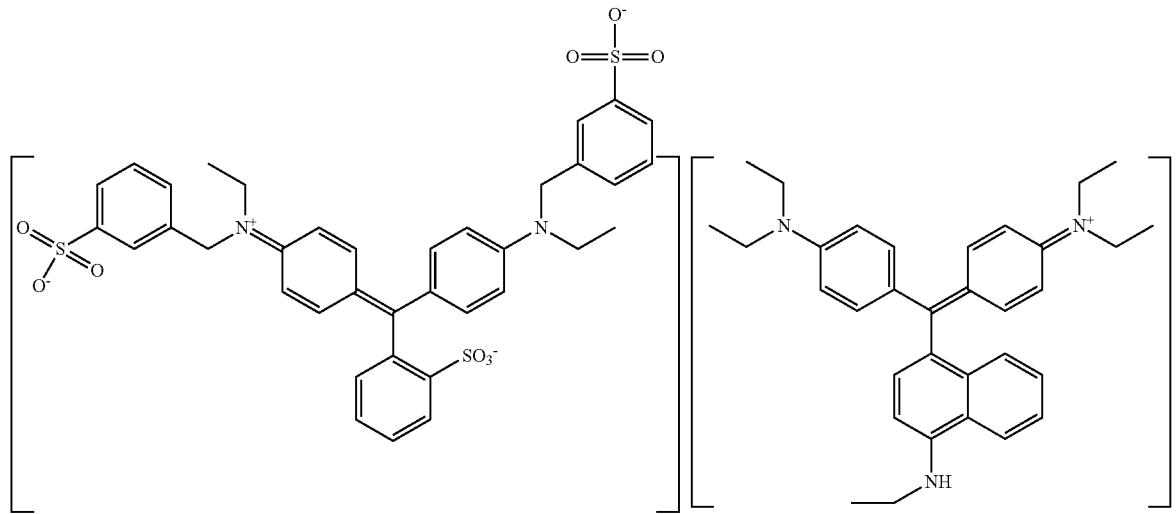
[Chemical Formula 4-4]
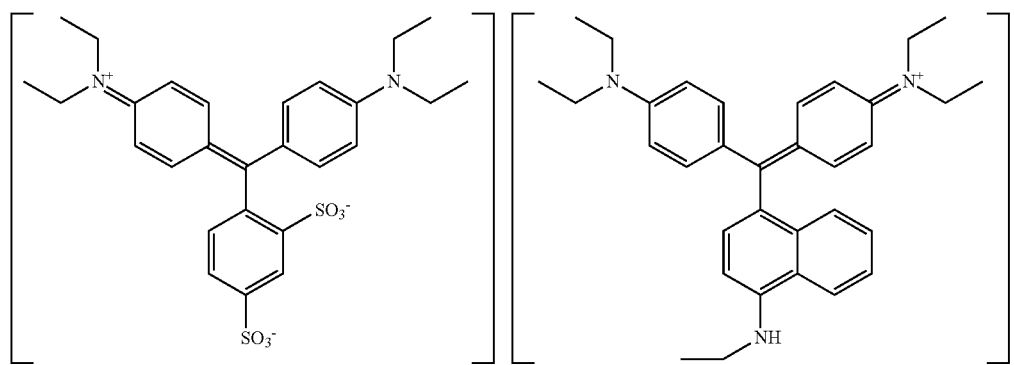
[Chemical Formula 4-5]
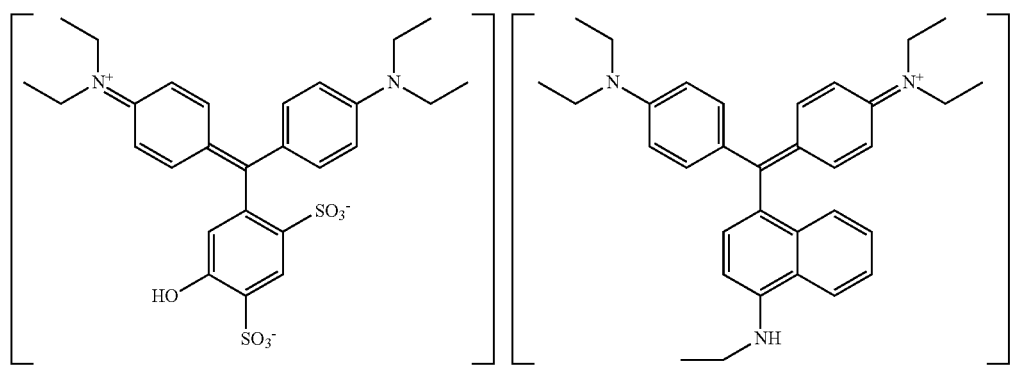

[Chemical Formula 4-6]

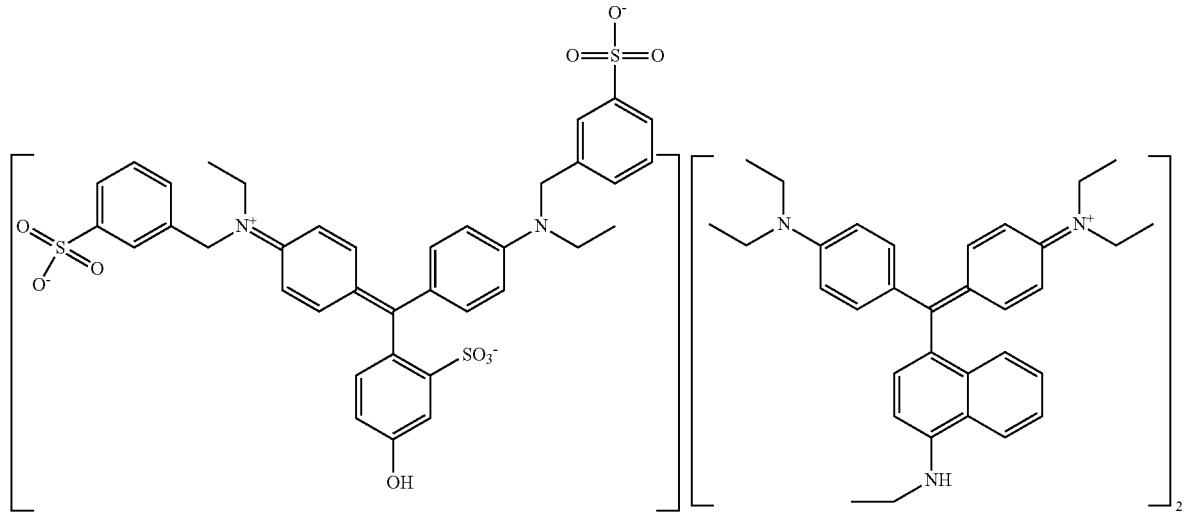

The triphenylmethane-based complex dye may have a maximum absorption in a wavelength region of about 550 nm to about 650 nm during a spectrum analysis. The triphenylmethane-based complex dye may have a transmittance in a wavelength region of about 450 nm of about 90% or higher. When the triphenylmethane-based complex dye has the maximum absorption and transmittance as described above, high luminance in the blue region may be achieved.

Another embodiment provides a photosensitive resin composition for a color filter including a colorant that includes the triphenylmethane-based complex dye described above.

The photosensitive resin composition for a color filter may include (A) a colorant including the triphenylmethane-based complex dye of an embodiment, (B) an acryl-based binder resin, (C) a photopolymerizable monomer, (D) a photopolymerization initiator, and (E) a solvent.

Hereinafter, the components of the photosensitive resin composition for a color filter are illustrated in detail.

(A) Colorant

The colorant may include a triphenylmethane-based complex dye represented by the above Chemical Formula 1.

The colorant may further include a dye other than the triphenylmethane-based complex dye, e.g., an organic solvent-soluble dye such as a triarylmethane-based compound, an anthraquinone-based compound, a benzylidene-based compound, a cyanine-based compound, a phthalocyanine-based compound, an azaporphyrin-based compound, an indigo-based compound, a xanthene-based compound, and the like.

In an implementation, the colorant may include a pigment in addition to the triphenylmethane-based complex dye.

The pigment may be a blue pigment or violet pigment. The blue pigment may include, e.g., C.I. blue pigment 15:6, C.I. blue pigment 15, C.I. blue pigment 15:1, C.I. blue pigment 15:2, C.I. blue pigment 15:3, C.I. blue pigment 15:4, C.I. blue pigment 15:5, C.I. blue pigment 16, C.I. blue pigment 22, C.I. blue pigment 60, C.I. blue pigment 64, C.I. blue pigment 80, or a combination thereof. The violet pigment may include, e.g., C.I violet pigment 1, C.I violet pigment 19, C.I violet pigment 23, C.I violet pigment 27, C.I violet pigment 29, C.I violet pigment 30, C.I violet pigment 32, C.I violet pigment 37, C.I violet pigment 40, C.I violet pigment 42, C.I violet pigment 50, or combination thereof. In an implementation, the pigment may include, e.g., C.I. blue pigment 15:6, C.I violet pigment 23, or a combination thereof.

The colorant may be included in an amount of about 0.1 to about 30 wt %, based on a total amount or weight of the photosensitive resin composition. In an implementation, the colorant may be included in an amount of about 0.2 to about 20 wt %, based on the total amount or weight of the photosensitive resin composition. Maintaining the amount of the colorant within this range may help ensure that excellent color characteristics and solubility are achieved.

(B) Acryl-Based Binder Resin

The acryl-based binder resin may be a copolymer of a first ethylenic unsaturated monomer and a second ethylenic unsaturated monomer (copolymerizable with the first ethylenic unsaturated monomer), and a resin including at least one acryl-based repeating unit.

The first ethylenic unsaturated monomer may be an ethylenic unsaturated monomer including at least one carboxyl group. Examples of the first ethylenic unsaturated monomer monomer may include acrylic acid, methacrylic acid, maleic acid, itaconic acid, fumaric acid, or a combination thereof.

The first ethylenic unsaturated monomer may be included in an amount of about 5 to about 50 wt %, e.g., from about 10 to about 40 wt %, based on a total amount or weight of the acryl-based resin.

Examples of the second ethylenic unsaturated monomer may include an aromatic vinyl compound, e.g., styrene, α-methylstyrene, vinyltoluene, vinylbenzylmethylether, and the like; an unsaturated carboxylic acid ester compound, e.g., methyl(meth)acrylate, ethyl(meth)acrylate, butyl(meth)acrylate, 2-hydroxyethyl(meth)acrylate, 2-hydroxy butyl(meth)acrylate, benzyl(meth)acrylate, cyclohexyl(meth)acrylate, phenyl(meth)acrylate, and the like; an unsaturated carboxylic acid amino alkyl ester compound, e.g., 2-aminoethyl(meth)acrylate, 2-dimethylaminoethyl(meth)acrylate, and the like; a carboxylic acid vinyl ester compound, e.g., vinyl acetate, vinyl benzoate, and the like; an unsaturated carboxylic acid glycidyl ester compound, e.g., glycidyl(meth)acrylate and the like; a vinyl cyanide compound, e.g., (meth)acrylonitrile and the like; an unsaturated amide compound, e.g., (meth)acrylamide and the like. The second ethylenic unsaturated monomers may be used singularly or as a mixture of two or more thereof.

Examples of the acryl-based resin may include a methacrylic acid/benzylmethacrylate copolymer, a methacrylic acid/benzylmethacrylate/styrene copolymer, a methacrylic acid/benzylmethacrylate/2-hydroxyethylmethacrylate copolymer, a methacrylic acid/benzylmethacrylate/styrene/ 2-hydroxyethylmethacrylate copolymer, and the like, but are not limited thereto. The acryl-based resins may be used singularly or as a mixture of two or more thereof.

The acryl-based resin may have a weight average molecular weight of about 3,000 to about 150,000 g/mol, e.g., about 5,000 to about 50,000 g/mol or about 2,000 to about 30,000 g/mol. Maintaining the weight average molecular weight of the acryl-based resin within this range may help ensure that the photosensitive resin composition has good physical and chemical properties and a suitable viscosity.

The acryl-based resin may have an acid value of about 15 to about 60 mgKOH/g, e.g., about 20 to about 50 mgKOH/g. Maintaining the acid value of the acryl-based resin within this range may help ensure that excellent pixel resolution is realized.

The acryl-based binder resin may be included in an amount of about 1 to about 30 wt %, based on the total amount or weight of the photosensitive resin composition. In an implementation, the acryl-based binder resin may be included in an amount of about 2 to about 20 wt %, based on the total amount or weight of the photosensitive resin composition. Maintaining the amount of the acryl-based binder resin within the range may help ensure that fine development properties are achieved in the manufacturing of a color filter and that cross-linking properties are improved to acquire excellent planar surface property.

(C) Photopolymerizable Monomer

The photopolymerizable monomer may be a mono-functional or multi-functional ester of (meth)acrylic acid including at least one ethylenic unsaturated double bond.

The photopolymerizable monomer may facilitate sufficient polymerization upon exposure during a pattern forming processes to form patterns having excellent heat resistance, light resistance, and chemical resistance, due to the ethylenic unsaturated double bond.

Examples of the photopolymerizable monomer may include ethylene glycol di(meth)acrylate, diethylene glycol di(meth)acrylate, triethylene glycol di(meth)acrylate, propylene glycol di(meth)acrylate, neopentyl glycol di(meth)acrylate, 1,4-butanediol di(meth)acrylate, 1,6-hexanediol di(meth)acrylate, bisphenolA di(meth)acrylate, pentaerythritol di(meth)acrylate, pentaerythritol tri(meth)acrylate, pentaerythritol tetra(meth)acrylate, pentaerythritol hexa(meth) acrylate, dipentaerythritol di(meth)acrylate, dipentaerythritol tri(meth)acrylate, dipentaerythritol penta (meth)acrylate, dipentaerythritol hexa(meth)acrylate, bisphenol A epoxy(meth)acrylate, ethylene glycol monomethylether (meth)acrylate, trimethylol propane tri(meth)acrylate, tris(meth)acryloyloxyethyl phosphate, novolac epoxy (meth)acrylate, and the like.

Commercially available examples of the photopolymerizable monomer are as follows. The mono-functional (meth) acrylic acid ester may include Aronix M-101®, M-111®, M-114® (TOAGOSEI CHEMICAL INDUSTRY CO., LTD.); KAYARAD TC-110S®, TC-120S® (NIPPON KAYAKU CO., LTD.); V-158®, V-2311® (OSAKA ORGANIC CHEMICAL IND., LTD.), and the like. Examples of a difunctional (meth)acrylic acid ester may include Aronix M-210®, M-240®, M-6200® (TOAGOSEI CHEMICAL INDUSTRY CO., LTD.), KAYARAD HDDA®, HX-220®, R-604® (NIPPON KAYAKU CO., LTD.), V-260®, V-312®, V-335 HP® (OSAKA ORGANIC CHEMICAL IND., LTD.), and the like. Examples of a tri-functional (meth)acrylic acid ester may include Aronix M-309®, M-400®, M-405®, M-450®, M-7100®, M-8030®, M-8060® (TOAGOSEI CHEMICAL INDUSTRY CO., LTD.), KAYARAD TMPTA®, DPCA-20®, DPCA-30®, DPCA-60®, DPCA-120® (NIPPON KAYAKU CO., LTD.), V-295®, V-300®, V-360®, V-GPT®, V-3PA®, V-400® (Osaka Yuki Kayaku Kogyo Co. Ltd.), and the like. The photopolymerizable monomer may be used singularly or as a mixture of two or more thereof.

In an implementation, the photopolymerizable monomer may be treated with acid anhydride to improve development properties.

The photopolymerizable monomer may be included in an amount of about 1 to about 20 wt %, based on the total amount or weight of the photosensitive resin composition. Maintaining the amount of the photopolymerizable monomer within this range may help ensure that curing at exposure during pattern forming processes is sufficiently performed and that alkali development properties are excellent.

(D) Photopolymerization Initiator

The photopolymerization initiator may include, e.g., an acetophenone-based compound, a benzophenone-based compound, a thioxanthone-based compound, a benzoin-based compound, a triazine-based compound, an oxime-based compound, or the like.

The acetophenone-based compound may include, e.g., 2,2'-diethoxy acetophenone, 2,2'-dibutoxy acetophenone, 2-hydroxy-2-methylpropinophenone, p-t-butyltrichloro acetophenone, p-t-butyldichloro acetophenone, 4-chloro acetophenone, 2,2'-dichloro-4-phenoxy acetophenone, 2-methyl-1-(4-(methylthio)phenyl)-2-morpholinopropan-1-one, 2-benzyl-2-dimethylamino-1-(4-morpholinophenyl)-butan-1-one, or the like.

The benzophenone-based compound may include, e.g., benzophenone, benzoyl benzoate, benzoyl methyl benzoate, 4-phenyl benzophenone, hydroxy benzophenone, acrylated benzophenone, 4,4'-bis(dimethyl amino)benzophenone, 4,4'-bis(diethylamino)benzophenone, 4,4'-dimethylaminobenzophenone, 4,4'-dichlorobenzophenone, 3,3'-dimethyl-2-methoxybenzophenone, or the like.

The thioxanthone-based compound may include, e.g., thioxanthone, 2-methylthioxanthone, isopropyl thioxanthone, 2,4-diethyl thioxanthone, 2,4-diisopropyl thioxanthone, 2-chlorothioxanthone, or the like.

The benzoin-based compound may include, e.g., benzoin, benzoin methyl ether, benzoin ethyl ether, benzoin isopropyl ether, benzoin isobutyl ether, benzyldimethylketal, or the like.

The triazine-based compound may include, e.g., 2,4,6-trichloro-s-triazine, 2-phenyl 4,6-bis(trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloro methyl)-s-triazine, 2-biphenyl 4,6-bis(trichloro methyl)-s-triazine, bis(trichloromethyl)-6-styryl-s-triazine, 2-(naphtho-1-yl)-4,6-bis (trichloromethyl)-s-triazine, 2-(4-methoxynaphtho-1-yl)-4, 6-bis(trichloromethyl)-s-triazine, 2-4-tri chloromethyl (piperonyl)-6-triazine, 2-4-trichloromethyl (4'-methoxystyryl)-6-triazine, or the like.

The oxime-based compound may include, e.g., 2-(o-benzoyloxime)-1-[4-(phenylthio)phenyl]-1,2-octandione, 1-(o-acetyloxime)-1-[9-ethyl-6-(2-methylbenzoyl)-9H-carbazol-3-yl]ethanone, or the like.

The photopolymerization initiator may further include, e.g., a carbazole-based compound, a diketone-based compound, a sulfonium borate-based compound, a diazo-based compound, a biimidazole-based compound, or the like.

The photopolymerization initiator may be included in an amount of about 0.1 to about 10 wt %, based on the total amount or weight of the photosensitive resin composition. Maintaining the amount of the photopolymerization initiator within this range may help ensure sufficient curing at exposure during pattern forming process while not deteriorating transmittance due to non-reacting initiators.

(E) Solvent

The solvent may be compatible with the colorant, acryl-based binder resin, photopolymerizable monomer, and photopolymerization initiator, without undergoing a reaction therewith.

Examples of the solvent may include alcohols, e.g., methanol, ethanol, and the like; ethers, e.g., dichloroethyl ether, n-butyl ether, diisoamyl ether, methylphenyl ether, tetrahydrofuran, and the like; glycol ethers, e.g., ethylene glycol monomethylether, ethylene glycol monoethylether, and the like; cellosolve acetates, e.g., methyl cellosolve acetate, ethyl cellosolve acetate, diethyl cellosolve acetate, and the like; carbitols, e.g., methylethyl carbitol, diethyl carbitol, diethylene glycol monomethylether, diethylene glycol monoethylether, diethylene glycol dimethylether, diethylene glycol methylethylether, diethylene glycol diethylether, and the like; propylene glycol alkylether acetates, e.g., propylene glycol methylether acetate, propylene glycol propylether acetate, and the like; aromatic hydrocarbon, e.g., toluene, xylene, and the like; ketones, e.g., methylethylketone, cyclohexanone, 4-hydroxy-4-methyl-2-pentanone, methyl-n-propylketone, methyl-n-butylketone, methyl-n-amylketone, 2-heptanone, and the like; saturated aliphatic monocarboxylic acid alkyl ester, e.g., ethyl acetate, n-butyl acetate, isobutyl acetate, and the like; lactate esters, e.g., methyl lactate, ethyl lactate, and the like; alkyl oxyacetate esters, e.g., methyl oxyacetate, ethyl oxyacetate, butyl oxyacetate, and the like; alkyl alkoxy acetate esters, e.g., methyl methoxy acetate, ethyl methoxy acetate, butyl methoxy acetate, methyl ethoxy acetate, ethyl ethoxy acetate, and the like; 3-oxy propionate alkylesters, e.g., 3-oxy methyl propionate, 3-oxy ethyl propionate, and the like; 3-alkoxy propionate alkyl ester, e.g., 3-methoxy methyl propionate, 3-methoxy ethyl propionate, 3-ethoxy ethyl propionate, 3-ethoxy methyl propionate, and the like; 2-oxy propionate alkyl esters, e.g., 2-oxy methyl propionate, 2-oxy ethyl propionate, 2-oxy propionic acid propyl, and the like; 2-alkoxy propionic acid alkyl esters, e.g., 2-methoxy methyl propionate, 2-methoxy ethyl propionate, 2-ethoxy ethyl propionate, 2-ethoxy methyl propionate, and the like; 2-oxy-2-methyl propionic acid esters, e.g., 2-oxy-2-methyl methyl propionate, 2-oxy-2-methyl ethyl propionate, and the like; monooxy monocarboxylic acid alkyl esters of 2-alkoxy-2-methyl propionic acid alkyl, e.g., 2-methoxy-2-methyl methyl propionate, 2-ethoxy-2-methyl ethyl propionate, and the like; esters, e.g., 2-hydroxy ethyl propionate, 2-hydroxy-2-methyl ethyl propionate, hydroxy ethyl acetate, 2-hydroxy-3-methyl methyl butanoate, and the like; and/or ketonate ester series, e.g., ethyl pyruvate, and the like. In an implementation, a high-boiling point solvents may be further added. The high boiling point solvent may include, e.g., N-methylformamide, N,N-dimethyl formamide, N-methylformanylide, N-methylacetamide, N,N-dimethyl acetamide, N-methylpyrrolidone, dimethylsulfoxide, benzylethylether, dihexylether, acetylacetone, isophorone, caproic acid, caprylic acid, 1-octanol, 1-nonanol, benzylalcohol, benzyl acetate, ethyl benzoate, diethyl oxalate, diethyl maleate, γ-butyrolactone, carbonate ethylene, carbonate propylene, phenyl cellosolve acetate, and the like.

Considering miscibility and reactivity, glycol ethers, e.g., ethylene glycol monoethylether, and the like; ethylene glycol alkylether acetates, e.g., ethyl cellosolve acetate, and the like; esters, e.g., 2-hydroxy ethyl propionate, and the like; diethylene glycols, e.g., diethylene glycol monomethylether, and the like; propylene glycol alkylether acetates, e.g., propylene glycol methylether acetate, propylene glycol propylether acetate, and the like, are preferred.

The solvent may be used as a balance, e.g., about 20 to about 90 wt %, based on the total amount or weight of the photosensitive resin composition. Maintaining the amount of the solvent within this range may help ensure that the photosensitive resin composition can be well applied and that excellent flatness is achieved.

(F) Other Additives

The photosensitive resin composition may further include an additive, e.g., a malonic acid; 3-amino-1,2-propanediol; a silane-based coupling agent including a vinyl group or a (meth)acryloxy group; a leveling agent; a fluorine-based surfactant; and/or a radical polymerization initiator. The additives may prevent stains, may improve leveling performance, and may also prevent residues from being generated due to undevelopment.

The photosensitive resin composition may further include an epoxy compound in order to improve close contacting properties with a substrate.

Examples of the epoxy compound may include a phenol novolac epoxy compound, a tetramethyl biphenyl epoxy compound, a bisphenol A epoxy compound, an alicyclic epoxy compound, or a combination thereof.

An amount of additive included may be controlled according to a desired physical property.

A color filter according to an embodiment may be manufactured by using the above-described photosensitive resin composition. The method for manufacturing the color filter is as follows.

The above-described photosensitive resin composition for a color filter may be applied onto a glass substrate which is not coated with anything and onto a glass substrate coated with $SiN_x$, which is a protective layer, in a thickness of about 500 to about 1500 Å through a proper method, such as a spin coating process or a slit coating method to have a thickness of about 3.1 to about 3.4 μm. After the coating process, the glass substrate may be irradiated with light to thereby form a desired pattern for the color filter. After the irradiation, the coating layer may be treated with an alkali development solution. Thus, a part of the composition not irradiated with the light may be dissolved to thereby form the desired pattern for the color filter. A color filter having a desired pattern may be acquired by repeatedly performing the process based on the number of R, G and B colors desired.

Also, in the process, crack resistance and solvent resistance may be further improved by heating an image pattern acquired from the development again or solidifying the image pattern through active ray radiation.

Hereinafter, this disclosure is illustrated in more detail with reference to examples. However, these are exemplary embodiments of this disclosure and are not limiting.

Dye Synthesis

Synthesis Example 1

About 1.05 g of thick hydrochloric acid 37% was added to a mixture of about 8.26 g (10 mmol) of Brilliant Blue R represented by the following Chemical Formula 5-1 and about 150 g of water so as to acquire a blue solution. The blue solution was agitated at a room temperature for about 15 minutes. About 5.14 g (10 mmol) of Victoria Pure Blue represented by the following Chemical Formula 5-2 was added to the solution, and about 150 g of water was added to the solution. The resultant solution was agitated for about one hour while being heated at about 70° C. The mixture was cooled to room temperature and agitated for about 12 hours. The acquired mixture was filtered and rinsed with about 300 g of water. The resultant mixture was vacuum-dried at about 50° C. to thereby acquire a triphenylmethane-based complex dye represented by the following Chemical Formula 4-1.

[Chemical Formula 5-1]

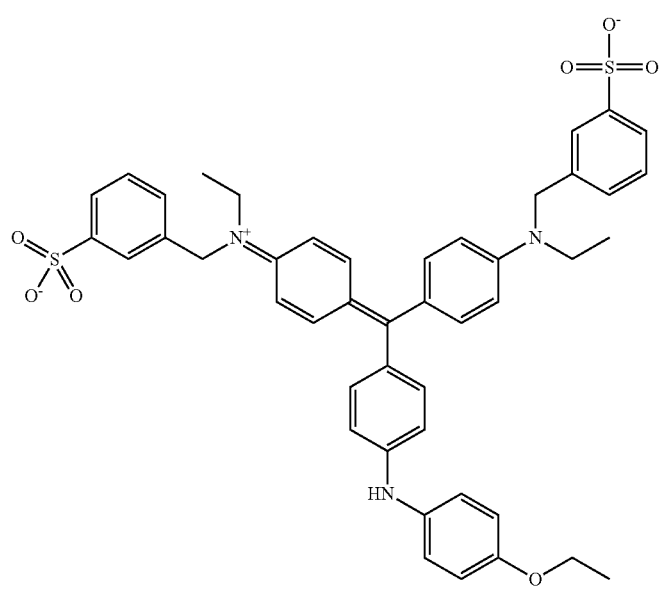

[Chemical Formula 5-2]

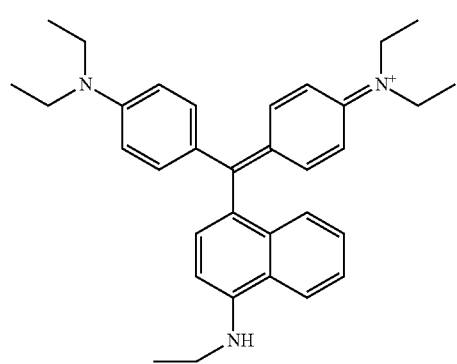

-continued

[Chemical Formula 4-1]

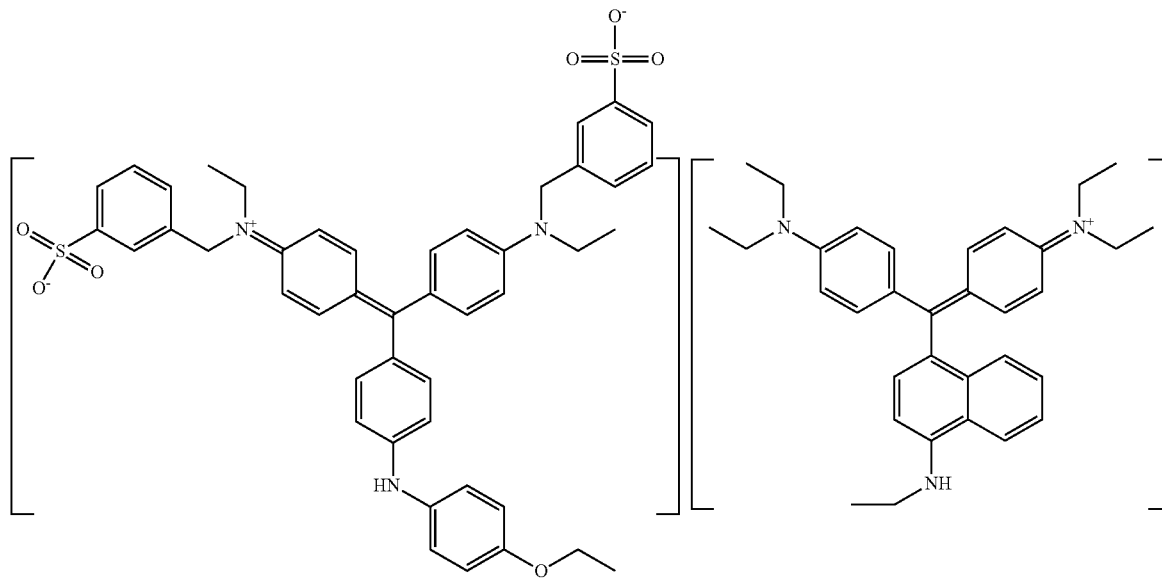

Synthesis Example 2

About 1.05 g of thick hydrochloric acid 37% was added to a mixture of about 8.54 g (10 mmol) of Brilliant Blue G represented by the following Chemical Formula 5-3 and about 150 g of water so as to acquire a blue solution. The blue solution was agitated at a room temperature for about 15 minutes. About 5.14 g (10 mmol) of Victoria Pure Blue represented by the above Chemical Formula 5-2 was added to the solution, and about 150 g of water was added to the solution. The resultant solution was agitated for about one hour while being heated at about 70° C. The mixture was cooled to room temperature and agitated for about 12 hours. The acquired mixture was filtered and rinsed with about 300 g of water. The resultant mixture was vacuum-dried at about 50° C. to thereby acquire a triphenylmethane-based complex dye represented by the following Chemical Formula 4-2.

[Chemical Formula 5-3]

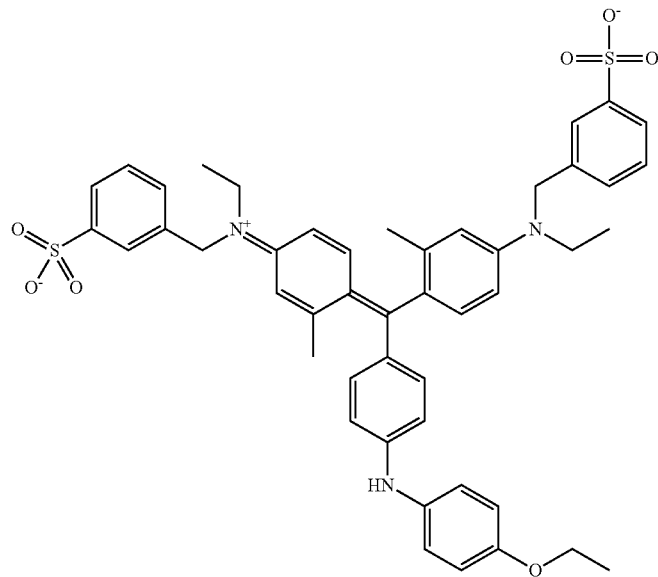

[Chemical Formula 4-2]

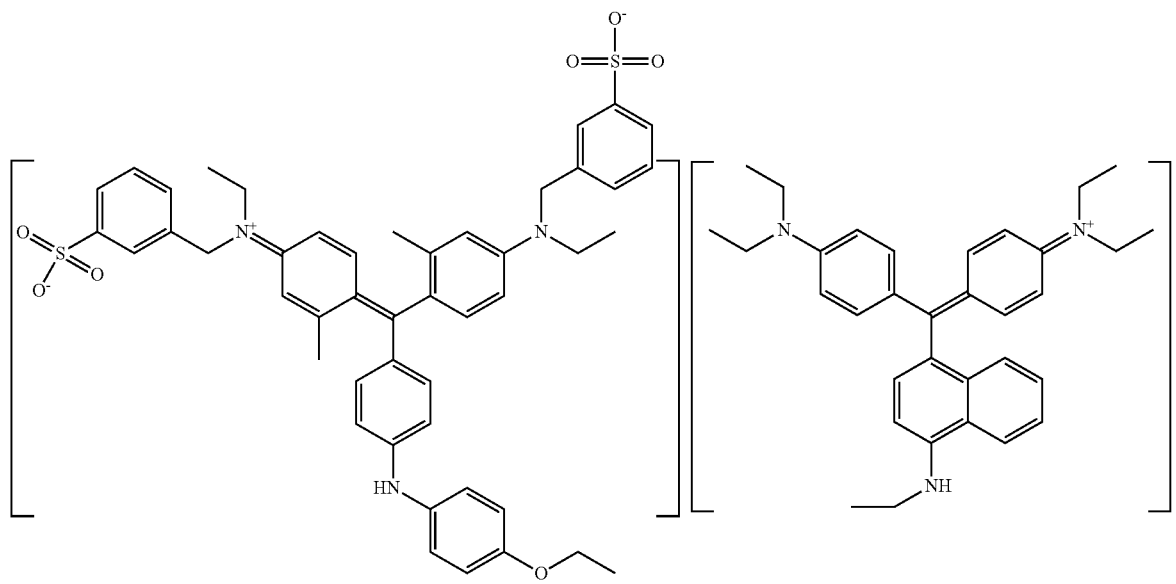

Synthesis Example 3

About 0.55 g of thick hydrochloric acid 37% was added to a mixture of about 1.98 g (2.5 mmol) of Erioglaucine represented by the following Chemical Formula 5-4 and about 100 g of water so as to acquire a blue solution. The blue solution was agitated at a room temperature for about 15 minutes. About 2.57 g (5.0 mmol) of Victoria Pure Blue represented by the above Chemical Formula 5-2 was added to the solution, and about 100 g of water was added to the solution. The resultant solution was agitated for about one hour while being heated at about 70° C. The mixture was cooled to room temperature and agitated for about 12 hours. The acquired mixture was filtered and rinsed with about 300 g of water. The resultant mixture was vacuum-dried at about 50° C. to thereby acquire a triphenylmethane-based complex dye represented by the following Chemical Formula 4-3.

[Chemical Formula 5-4]

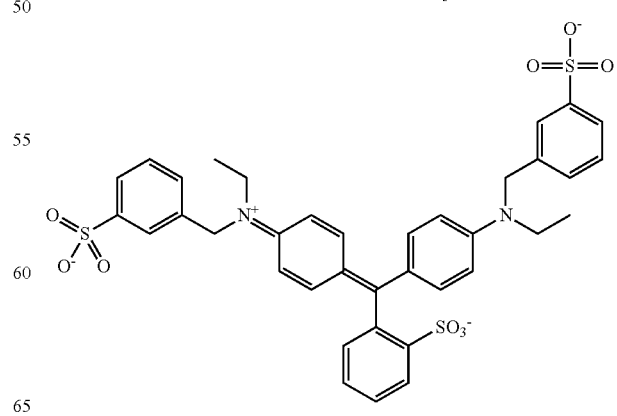

[Chemical Formula 4-3]

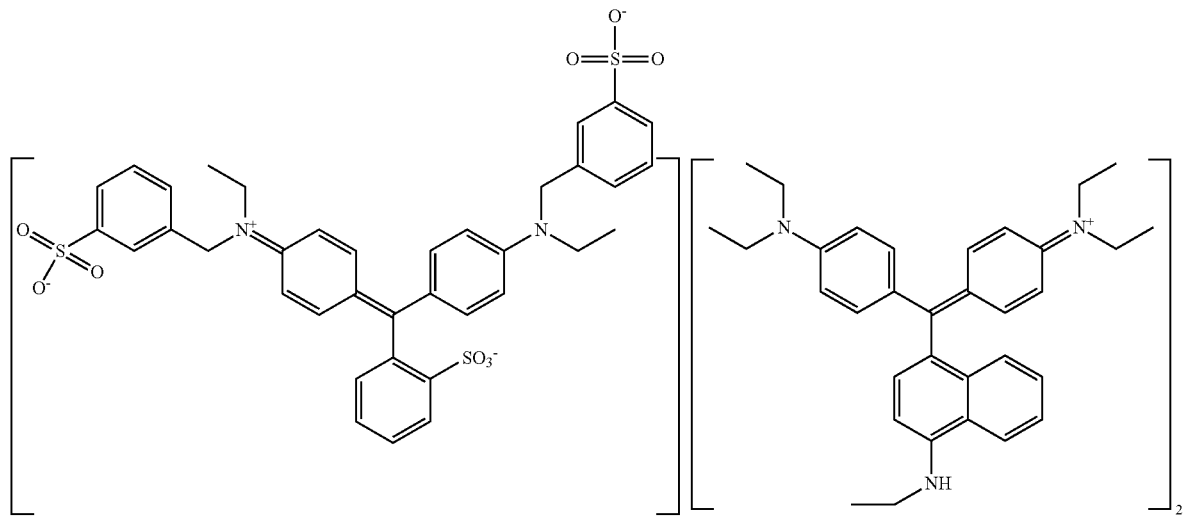

Synthesis Example 4

About 0.55 g of thick hydrochloric acid 37% was added to a mixture of about 5.66 g (5.0 mmol) of Patent Blue VF (50 wt % dye) represented by the following Chemical Formula 5-5 and about 100 g of water so as to acquire a blue solution. The blue solution was agitated at a room temperature for about 15 minutes. About 2.57 g (5.0 mmol) of Victoria Pure Blue represented by the above Chemical Formula 5-2 was added to the solution, and about 100 g of water was added to the solution. The resultant solution was agitated for about one hour while being heated at about 70° C. The mixture was cooled to room temperature and agitated for about 12 hours. The acquired mixture was filtered and rinsed with about 300 g of water. The resultant mixture was vacuum-dried at about 50° C. to thereby acquire a triphenylmethane-based complex dye represented by the following Chemical Formula 4-4.

[Chemical Formula 5-5]

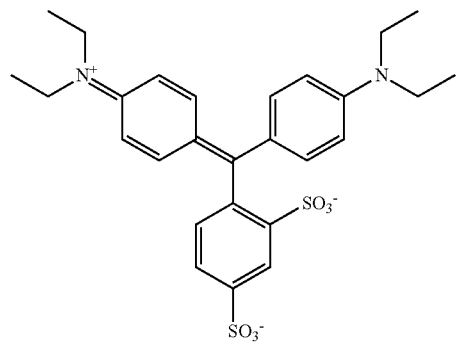

[Chemical Formula 4-4]

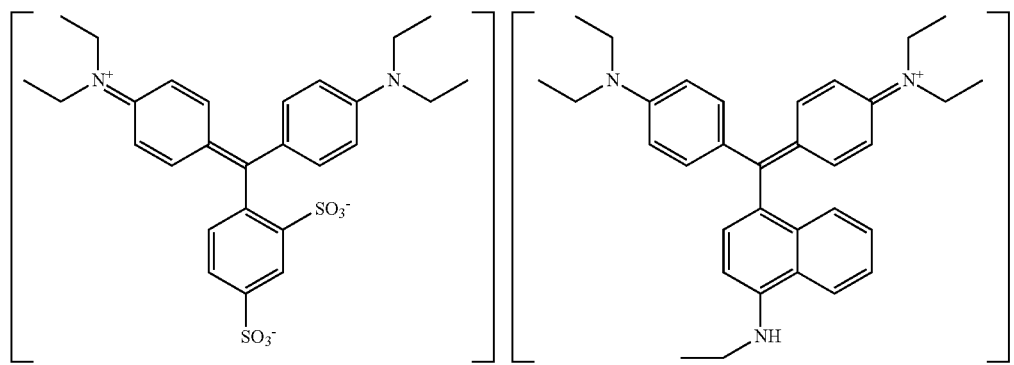

Synthesis Example 5

About 0.55 g of thick hydrochloric acid 37% was added to a mixture of about 2.9 g (5.0 mmol) of Patent Blue V represented by the following Chemical Formula 5-6 and about 100 g of water so as to acquire a blue solution. The blue solution was agitated at a room temperature for about 15 minutes. About 2.57 g (5.0 mmol) of Victoria Pure Blue represented by the above Chemical Formula 5-2 was added to the solution, and about 100 g of water was added to the solution. The resultant solution was agitated for about one hour while being heated at about 70° C. The mixture was cooled to room temperature and agitated for about 12 hours. The acquired mixture was filtered and rinsed with about 300 g of water. The resultant mixture was vacuum-dried at about 50° C. to thereby acquire a triphenylmethane-based complex dye represented by the following Chemical Formula 4-5.

Synthesis Example 6

About 0.55 g of thick hydrochloric acid 37% was added to a mixture of about 2.38 g (2.5 mmol) of Fast Green FCF (85 wt % dye) represented by the following Chemical Formula 5-7 and about 100 g of water so as to acquire a blue solution. The blue solution was agitated at a room temperature for about 15 minutes. About 2.57 g (5.0 mmol) of Victoria Pure Blue represented by the above Chemical Formula 5-2 was added to the solution, and about 100 g of water was added to the solution. The resultant solution was agitated for about two hours while being heated at about 50° C. The mixture was cooled to room temperature and agitated for about 12 hours. The acquired mixture was filtered and rinsed with about 300 g of water. The resultant mixture was vacuum-dried at about 50° C. to thereby acquire a triphenylmethane-based complex dye represented by the following Chemical Formula 4-6.

[Chemical Formula 5-6]

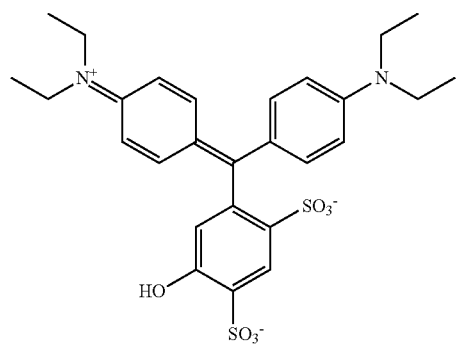

[Chemical Formula 4-5]

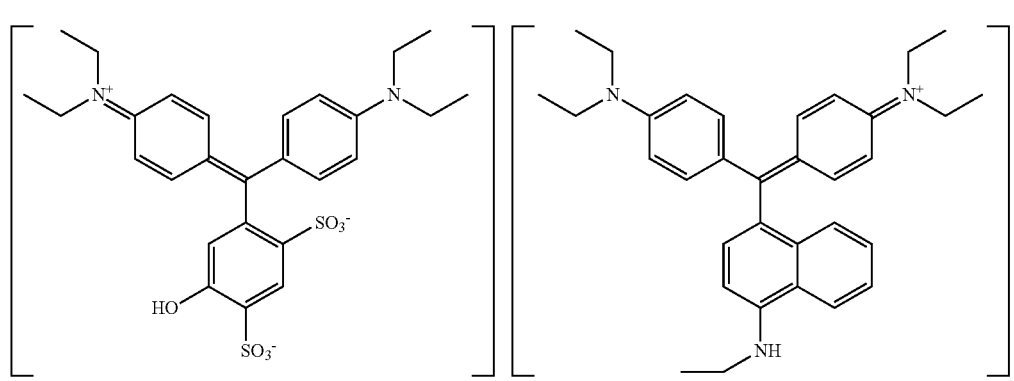

[Chemical Formula 5-7]

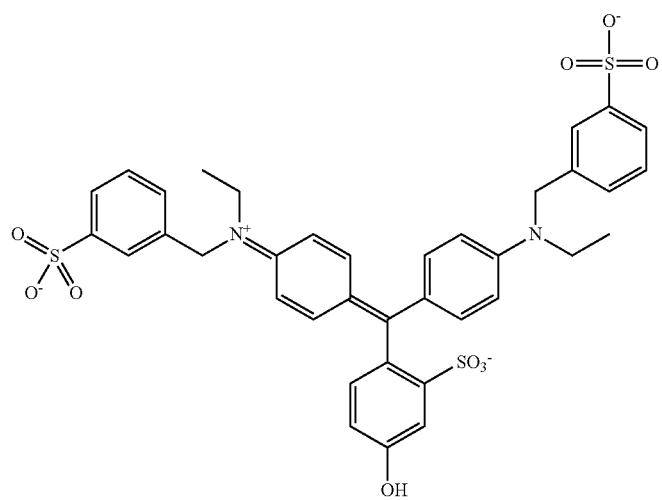

[Chemical Formula 4-6]

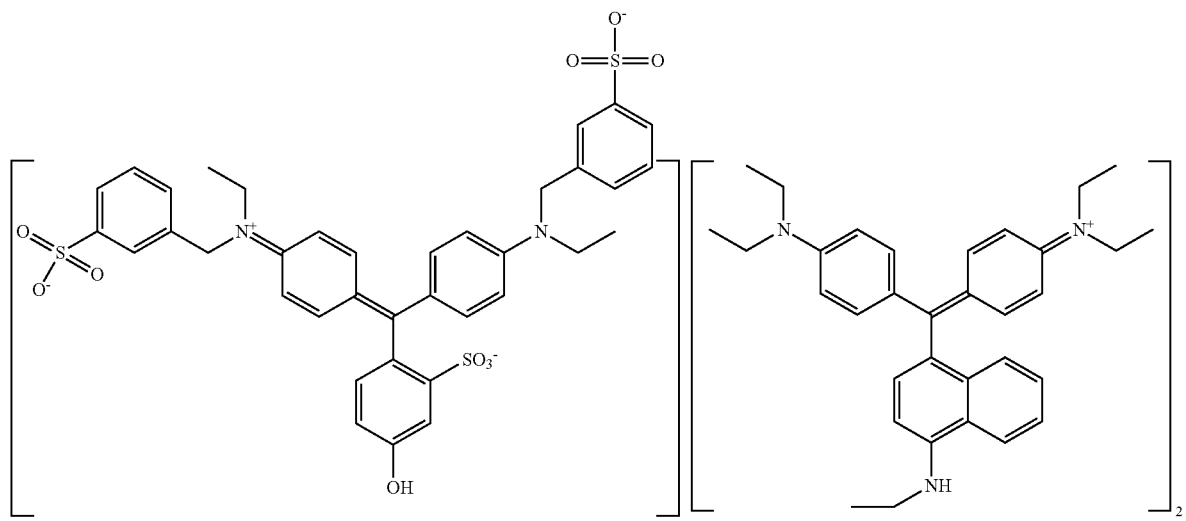

Examples 1 to 6

Preparation of Photosensitive Resin Composition

Photosensitive resin compositions according to Examples 1 to 6 were prepared to have the compositions shown in the following Table 1.

In particular, a photopolymerization initiator was dissolved in a solvent and agitated at a room temperature for about 2 hours. Then, a colorant, an acryl-based binder resin, and a photopolymerizable monomer were added thereto and agitated at a room temperature for about 2 hours. Subsequently, a photosensitive resin composition was prepared by filtering the product three times and removing impurities.

(A) Colorant
(A-1) The triphenylmethane-based complex dye acquired from Synthesis Example 1.
(A-2) The triphenylmethane-based complex dye acquired from Synthesis Example 2.
(A-3) The triphenylmethane-based complex dye acquired from Synthesis Example 3.
(A-4) The triphenylmethane-based complex dye acquired from Synthesis Example 4.
(A-5) The triphenylmethane-based complex dye acquired from Synthesis Example 5.
(A-6) The triphenylmethane-based complex dye acquired from Synthesis Example 6.
(B) Acryl-Based Binder Resin
Acrylic acid/benzylmethacrylate copolymer (produced by Miwon Commercial Co., Ltd., NPR1520).
(C) Photopolymerizable Monomer
Dipentaerythritolhexaacrylate
(D) Photopolymerization Initiator
CGI-124 produced by Ciba Specialty Chemicals
(E) Solvent
Cyclohexanone

TABLE 1

|  | Examples | | | | | |
|---|---|---|---|---|---|---|
|  | 1 | 2 | 3 | 4 | 5 | 6 |
| (A) colorant (wt %) | | | | | | |
| A-1 | 0.25 | — | — | — | — | — |
| A-2 | — | 0.25 | — | — | — | — |

TABLE 1-continued

|  | Examples | | | | | |
|---|---|---|---|---|---|---|
|  | 1 | 2 | 3 | 4 | 5 | 6 |
| A-3 | — | — | 0.25 | — | — | — |
| A-4 | — | — | — | 0.25 | — | — |
| A-5 | — | — | — | — | 0.3 | — |
| A-6 | — | — | — | — | — | 0.3 |
| (B) acryl-based binder resin (wt %) | 4 | 4 | 4 | 4 | 4 | 4 |
| (C) photopolymerizable monomer (wt %) | 9 | 9 | 9 | 9 | 9 | 9 |
| (D) photopolymerization initiator (wt %) | 1.5 | 1.5 | 1.5 | 1.5 | 1.5 | 1.5 |
| (E) solvent (wt %) | 85.25 | 85.25 | 85.25 | 85.25 | 85.2 | 85.2 |

Evaluation 1: Measurement of Spectrum Characteristics of Triphenylmethane-Based Complex Dye Absorbance of the triphenylmethane-based complex dyes used in Examples 1 to 6 (e.g., the complex dyes of Chemical Formulae 4-1 to 4-6) was measured and the measurement result is presented in FIG. 1.

The absorbance was measured by preparing a cyclohexanone solution including about 0.001 wt % of the respective dyes and using an 8356 UV-visible spectroscopy system produced by the Agilent company.

FIG. 1 illustrates a graph showing absorbances of the triphenylmethane-based complex dyes used in Examples 1 to 6. It may be seen from FIG. 1 that the triphenylmethane-based complex dye used in Examples 1 to 6 showed a transmittance of about 90% or higher in the wavelength region of about 450 nm.

(Formation of Pattern for Color Filter)

Conductive films were formed to a thickness of about 2 μm by coating a 1 mm-thick glass substrate (which was obtained after fat-removing rinsing) with the photosensitive resin compositions prepared according to Examples 1 to 6, respectively, and drying on a hot plate of about 90° C. for about 2 minutes. Subsequently, a pattern for a color filter was formed by exposing the conductive films with a high-pressure mercury lamp having a wavelength of about 365 nm and drying the conductive films at about 160° C. through a forced convection oven drying process for about 20 minutes.

Evaluation 2: Measurement of Heat Resistance, Color Characteristics and Contrast Ratio of Pattern for Color Filter Color characteristics, heat resistance, and contrast ratio of the patterns for a color filter formed according to Examples 1 to 6 were measured and the measurement results were presented in the following Table 2.

(1) Measurement of heat resistance: A color difference between before and after postbaking was measured by using a spectrophotometer (produced by Otsuka company, MCPD 3000). When the color difference was within about 3, it was regarded that the heat resistance is satisfied. For example, the smaller the color difference, the higher the heat resistance.

(2) Measurement of color characteristics: After the postbaking, color characteristics of the patterns were measured by using a spectrophotometer (produced by Otsuka company, MCPD 3000). In particular, transmittance in a wavelength region of about 450 nm was measured. For equal comparison, the value was converted in such a manner that the transmittance in the wavelength region of about 600 nm was about 2% or smaller.

(3) Measurement of contrast ratio: Contrast ratio was measured by using a contrast ratio measuring instrument (produced by Tsubosaka Electronic company, CT-1, 30,000:1).

TABLE 2

|  | Color difference between before and after postbaking | Transmittance (%) | | Contrast ratio |
|---|---|---|---|---|
|  |  | @ 450 nm | @ 600 nm |  |
| Example 1 | 2.8 | 94 | 2 | 14500 |
| Example 2 | 2.7 | 93 | 2 | 14100 |
| Example 3 | 1.7 | 97 | 2 | 14200 |
| Example 4 | 2.0 | 93 | 2 | 14000 |
| Example 5 | 1.6 | 96 | 2 | 14300 |
| Example 6 | 2.8 | 90 | 2 | 14000 |

It may be seen from Table 2 that the patterns of Examples 1 to 6 using the triphenylmethane-based complex dye of an embodiment exhibited excellent heat resistance, high transmittance, and high contrast ratio.

By way of summation and review, uniformity between the pigment and a photoresist composition may cause the contrast ratio of the color filter to deteriorate. Also, pigments may have a restricted chromophore structure. Thus, the restricted pigment material may not realize diverse colors, and moreover, it may be difficult to expect a considerable extent of improvement in the transmittance of a particular color.

Thus, the embodiments provide a dye-type colorant having excellent solubility and reliability while also having excellent color characteristics.

The embodiments provide a dye having excellent heat resistance, high color transmittance, and high contrast ratio. Thus, the dye may be used for manufacturing a color filter having excellent pattern characteristics, development processing property, chemical resistance, and color reproducibility from a photosensitive resin composition including the dye.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A triphenylmethane-based complex dye represented by the following Chemical Formula 1:

[Chemical Formula 1]

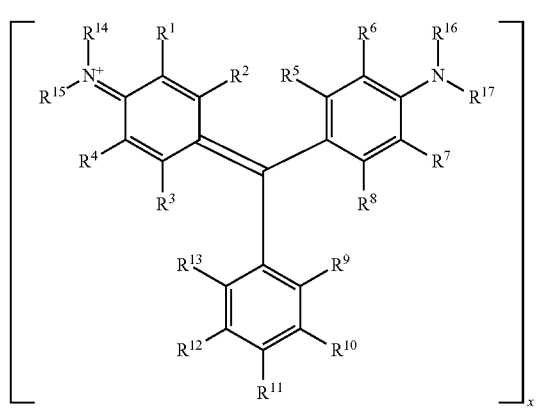

-continued

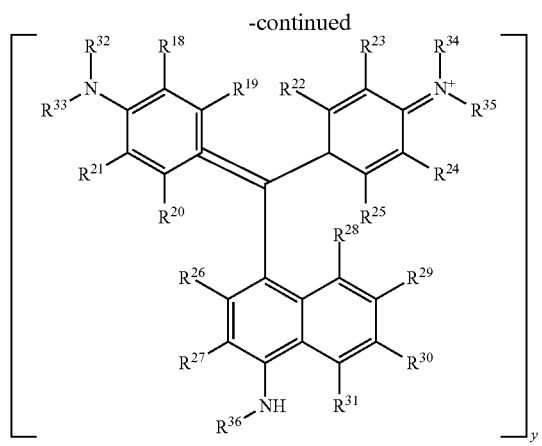

wherein, in Chemical Formula 1,
R$^1$ to R$^{17}$ are each independently hydrogen, a substituted or unsubstituted C1 to C20 alkyl group, a sulfonate group, a hydroxyl group, or a substituent represented by the following Chemical Formula 3, provided that at least two of R$^1$ to R$^{17}$ are a sulfonate group or a substituent represented by the following Chemical Formula 3,
R$^{18}$ to R$^{31}$ are each independently hydrogen or a substituted or unsubstituted C1 to C20 alkyl group,
R$^{32}$ to R$^{35}$ are each independently hydrogen or a substituted or unsubstituted C1 to C5 alkyl group,
R$^{36}$ is a substituted or unsubstituted C1 to C20 alkyl group, and
x and y are each an integer of about 1 to about 3,

[Chemical Formula 3]

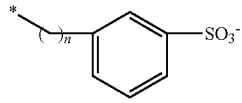

wherein, in Chemical Formula 3, n is an integer of about 1 to about 5.

2. The triphenylmethane-based complex dye as claimed in claim 1, wherein the triphenylmethane-based complex dye represented by Chemical Formula 1 is a complex represented by one of the following Chemical Formulae 4-3 to 4-6:

Chemical Formula 4-3]

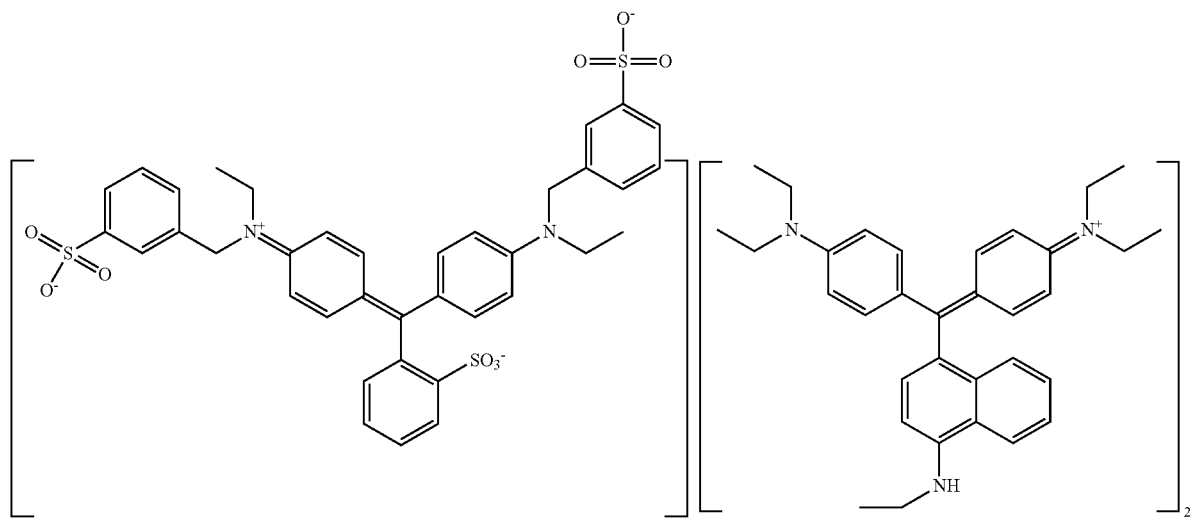

[Chemical Formula 4-4]

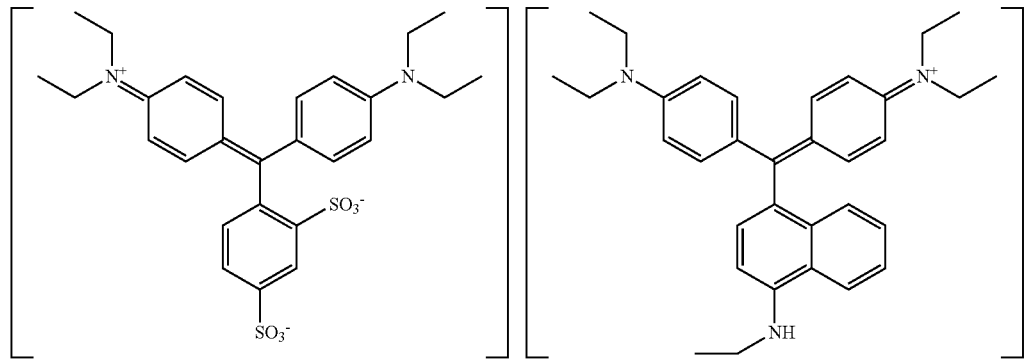

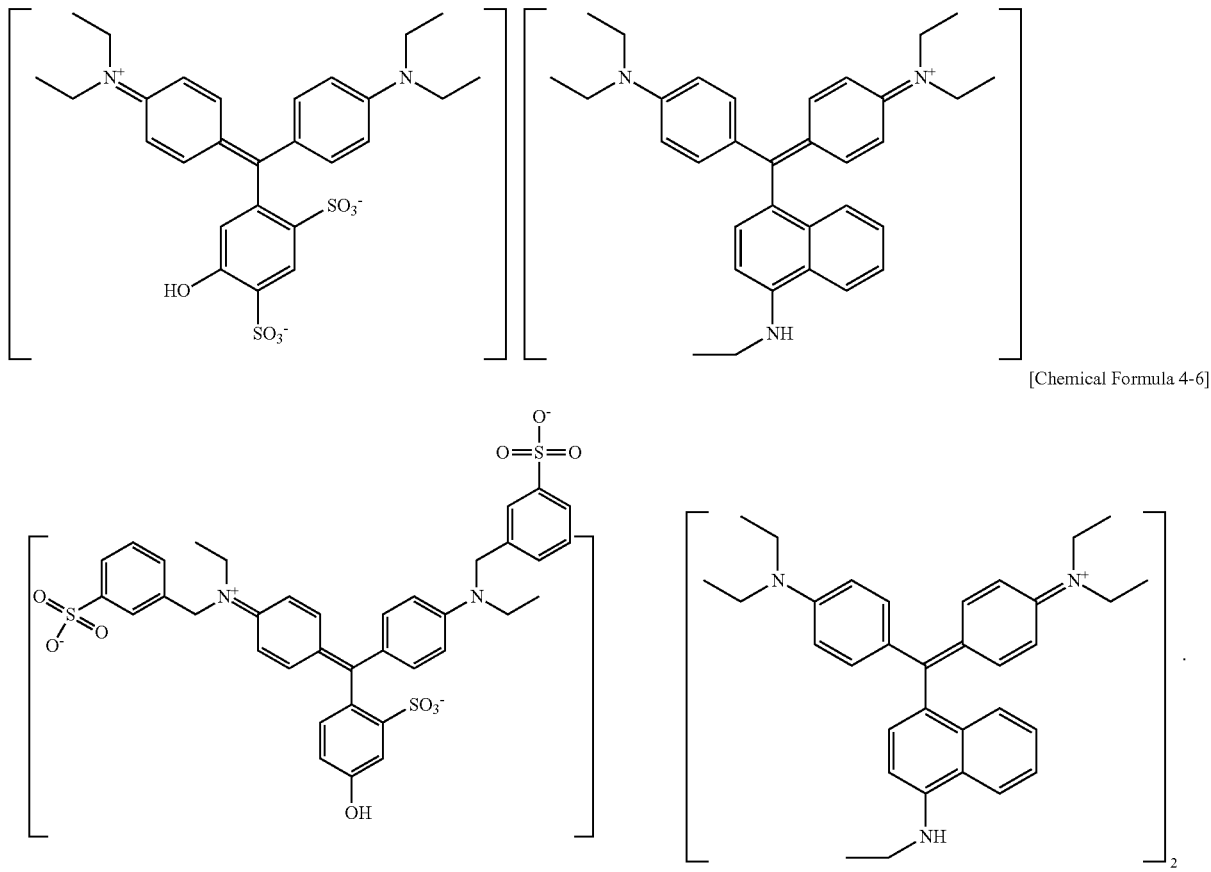

3. The triphenylmethane-based complex dye as claimed in claim 1, wherein the triphenylmethane-based complex dye has a maximum absorption in a wavelength region of about 550 nm to about 650 nm.

4. The triphenylmethane-based complex dye as claimed in claim 1, wherein the triphenylmethane-based complex dye has a transmittance of about 90% or higher at a wavelength region of about 450 nm.

5. A photosensitive resin composition for a color filter, the photosensitive resin composition comprising:
   a colorant, the colorant including the triphenylmethane-based complex dye as claimed in claim 1;
   an acryl-based binder resin;
   a photopolymerizable monomer;
   a photopolymerization initiator; and
   a solvent.

6. The photosensitive resin composition for a color filter as claimed in claim 5, wherein the photosensitive resin composition includes:
   about 0.1 to about 30 wt % of the colorant,
   about 1 to about 30 wt % of the acryl-based binder resin,
   about 1 to about 20 wt % of the photopolymerizable monomer,
   about 0.1 to about 10 wt % of the photopolymerization initiator, and
   a balance amount of the solvent, all wt % being based on a total weight of the composition.

7. The photosensitive resin composition for a color filter as claimed in claim 5, wherein the colorant further includes a pigment.

8. A color filter prepared from the photosensitive resin composition as claimed in claim 5.

* * * * *